United States Patent
Guttenberger et al.

(10) Patent No.: US 6,565,221 B2
(45) Date of Patent: May 20, 2003

(54) ADJUSTING DEVICE FOR A MOTOR VEHICLE MIRROR WITH CONTACTOR

(75) Inventors: Richard Guttenberger, Nuremberg (DE); Werner Seichter, Nuremberg (DE)

(73) Assignee: Buehler Motor GmbH, Nuremberg (DE)

(*) Notice: Subject to any disclaimer, the term of this patent is extended or adjusted under 35 U.S.C. 154(b) by 0 days.

(21) Appl. No.: 09/989,167

(22) Filed: Nov. 21, 2001

(65) Prior Publication Data

US 2002/0063978 A1 May 30, 2002

(30) Foreign Application Priority Data

Nov. 25, 2000 (DE) .......................... 100 58 730

(51) Int. Cl.[7] .............................................. G02B 7/182
(52) U.S. Cl. .................... 359/877; 359/876; 359/872; 359/874
(58) Field of Search ................. 359/877, 876, 359/872, 871, 874; 248/476, 475.1, 477, 478, 479; 74/89.18, 89.19, 502.1

(56) References Cited

U.S. PATENT DOCUMENTS

| 4,776,231 A | * | 10/1988 | Cummins et al. .......... 74/502.1 |
| 5,969,891 A | * | 10/1999 | Otenio et al. ............... 359/871 |
| 6,341,536 B1 | * | 1/2002 | Guttenberger et al. ........ 380/44 |
| 6,386,717 B2 | * | 5/2002 | Miyabukuro ............... 359/879 |

* cited by examiner

Primary Examiner—Mohammad Sikder
(74) Attorney, Agent, or Firm—Jacobson Holman PLLC

(57) ABSTRACT

Adjusting device for the outside mirror of a motor vehicle, comprising a drive housing, on which is mounted a mirror glass carrier that is mounted by means of a central ball and cap bearing and that is provided with intersecting toothed strips, chains or the like, which, enveloping the shell-like drive housing, are in engagement with output toothed gears of two drive motors, disposed in the drive housing, and comprising an electric contactor for the mirror glass to supply electric energy to heat the mirror, dim the mirror or the like, wherein the contact connecting lines are guided through the central axis of the ball and cap bearing.

4 Claims, 1 Drawing Sheet

ADJUSTING DEVICE FOR A MOTOR VEHICLE MIRROR WITH CONTACTOR

BACKGROUND OF THE INVENTION

(1) Field of the Invention

The invention relates to an adjusting device for the outside mirror of a motor vehicle that includes a drive housing and a mirror glass, in general, and to and to an electric contactor for the mirror glass to supply electric energy to heat the mirror, dim the mirror or the like, wherein the contact connecting lines are guided through the central axis of a ball and cap bearing formed in the adjusting device, in particular.

(2) Description of Related Art

The conventional adjusting device for the outside mirror of a motor vehicle includes a drive housing. A mirror glass carrier is mounted on the drive housing by means of a central ball and cap bearing and which is provided with intersecting toothed strips, chains or the like, that, enveloping the shell-like drive housing, are in engagement with output toothed gears of two drive motors, disposed in the drive housing, and with an electric contactor for the mirror glass to supply electric energy to heat the mirror, dim the mirror or the like. Co-pending U.S. patent application Ser. No. 09/559,398, *Actuating Mechanism for Motor Vehicles,* discloses a structure that is very similar to the general construction of the adjusting device discussed above. The co-pending application is incorporated by reference herein as if reproduced in full for its entire content.

Normally such adjusting devices, which are also called glass drives, are designed in such a manner that the contacts of the mirror glass for heating or the like are contacted from the outside. This means that special lines have to be led in from the outside, a condition that not only renders the construction and assembly more difficult, but also impedes the swivel adjustment of the mirror glass with the mirror glass carrier.

Therefore, the invention is based on the problem of designing the adjusting device of the type described in such a manner that from the point of view of both production and assembly simpler contacting of the mirror glass is possible without disturbing outside lines.

BRIEF SUMMARY OF THE INVENTION

The invention provides the solution to this problem in that the contacting lines are guided through the central axis of the ball and cap bearing.

In so doing, the invention exploits a special feature of the drive transfer by means of the intersecting toothed strips, chains or the like, which simultaneously make sure that the joint ball of the mirror glass carrier is held in the joint cap of the drive housing and does not simply fall out. Thus, there is no need for the typical screw connection or snap connection provided in the axis of the ball and cap bearing. Examples of the ball and cap bearing arrangement are discussed in co-pending application Ser. No. 09/559,398 as well as U.S. Pat. No. 5,938,166 and German Patent No. 0 075 259, both of which are incorporated by reference herein as if reproduced in full. The absence of this screw connection, by means of which the mirror glass carrier and the drive housing were held together in the past, makes it possible to provide passages in the joint ball and the joint cap, through which the contact connecting lines can be led.

A further development of the invention proved especially expedient when a tube, which ends preferably upstream of the aligned passages of the joint ball and the joint cap, is molded to the drive housing. The contact connecting lines are guided in the tube and these lines in turn are connected to the lateral plug member on the attachment housing. The tube, which serves the purpose of guiding, prevents the connecting lines from making contact with the moveable parts of the drive device and in addition supports the contact connecting lines, which are provided preferably with spring contact lugs, resting on complementary contacts on the mirror glass. Owing to the support in the tube, a quite springy contacting is easily obtained.

BRIEF DESCRIPTION OF THE SEVERAL VIEWS OF THE DRAWINGS

Other advantages, features and details of the invention are disclosed in the following description of the embodiment and with reference to the drawings.

DETAILED DESCRIPTION OF THE INVENTION

Figure 1:
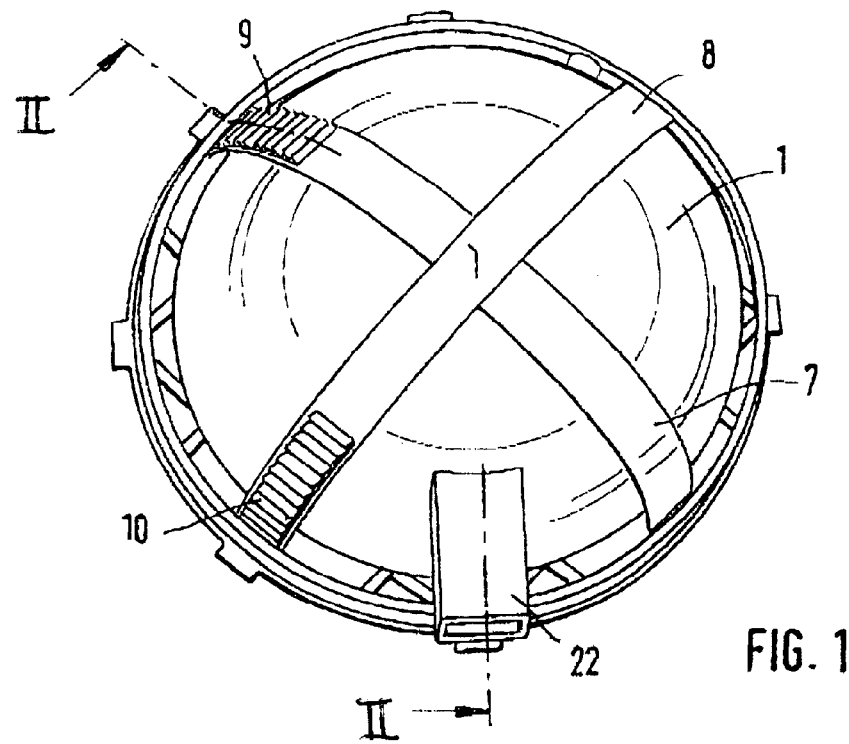
FIG. 1 is a perspective view of the inventive adjusting device from the rear.
Figure 2:
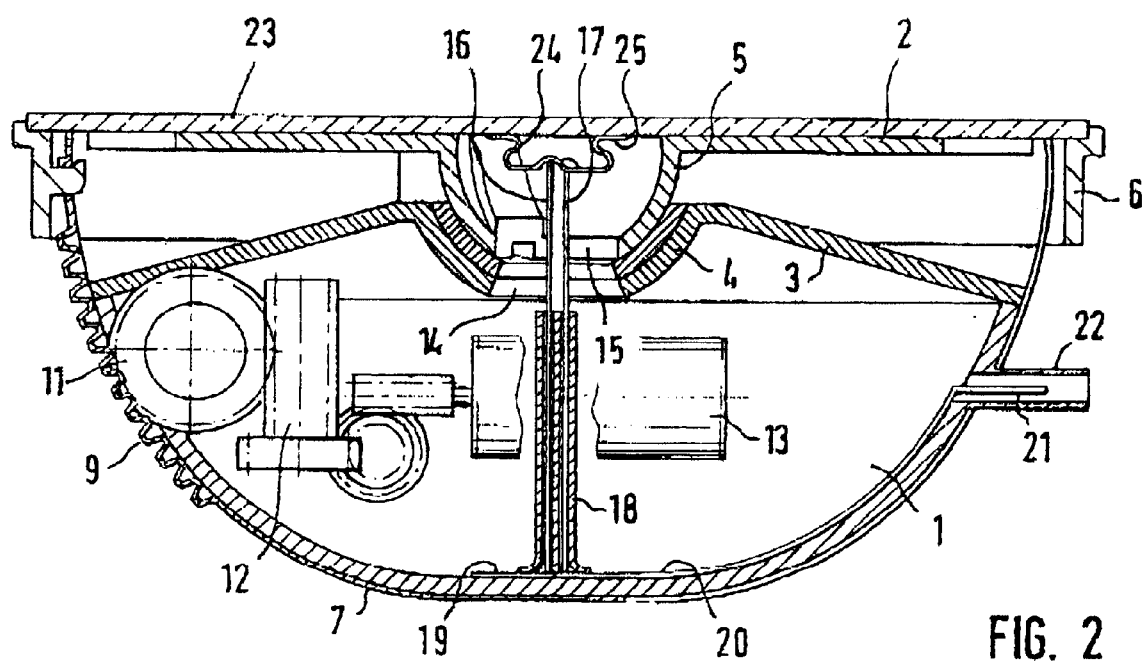
FIG. 2 is a bent sectional view along the line II—II in FIG. 1.

FIGS. 1 and 2 show clearly a generally hemispherically shaped drive housing 1, in whose front wall 3, facing the mirror glass carrier 2, is molded a joint spherical cap 4, with which a spherical joint ball 5 engages. The joint cap 5 is molded to the mirror glass carrier 2. In the illustrated example, the mirror glass carrier 2, provided with a peripheral ring wall 6, is shown with two intersecting elastic metal strips 7 and 8, which are designed at least in part as toothed strips 9 and 10. The output toothed gears 11 of electric drive devices 12 and 13, that are disposed inside the drive housing 1 and which are not illustrated in detail, engage with these toothed strips 9 and 10. As mentioned before, many of the details of this structure are discussed in incorporated patent application Ser. No. 09/559,398.

With the aid of the drive devices the mirror glass carrier 2 can be swiveled with respect to the drive housing 1 and two axes, intersecting at right angles. The joint cap 4 with the related joint shell and the joint ball 5 are provided with relatively large hollow passages 14 and 15, through which the contact connecting lines 16 and 17 for heating the mirror, dimming the mirror or the like, are guided. These contact connecting lines 16 and 17 are guided through a hollow tube 18 that is disposed in the axis of the drive housing 1. The tube 18 protects the connecting lines 16 and 17 against contact with moveable parts of the drive device. The contact connecting lines 16 and 17 are connected by means of the contact lugs 19 and 20, disposed and mounted inside the drive housing, to the contacts 21 of a plug member 22, molded laterally to the drive housing, or designed "as one piece". The contacting of the complementary contacts (not illustrated in the drawing) on the mirror glass 23 can occur by means of the spring contact lugs 24 and 25, which are connected to the contact connecting lines 16 and 17.

The size of the passages—which in the present embodiment are possible because the drive housing 1 and the mirror glass carrier 2 are held together by means of the toothed strips 9 and 10—is chosen in such a manner that even in the extreme angular positions of the mirror glass carrier with respect to the drive housing an aligned area of both passages 14 and 15 remains in the center for the contact connecting lines 16 and 17.

What is claimed is:

1. An adjusting device for the outside mirror of a motor vehicle, the adjusting device comprising:

a drive housing;

a mirror glass carrier;

a central ball and cap bearing for mounting the mirror glass carrier to the drive housing, the ball and cap bearing having a central axis;

intersecting toothed strips enveloping the shell-like drive housing, the tooth stripes in engagement with output toothed gears of two drive motors, disposed in the drive housing;

an electric contactor for the mirror glass to supply electric energy, the electric contactor including contact connecting lines guided through the central axis of the ball and cap bearing.

2. The adjusting device, as claimed in claim 1, further comprising;

At least one lateral plug member on the drive housing;

aligned passages defined in the ball and cap bearing;

a tube molded to the drive housing, the tube ending with the shell-like structure of the drive housing and the cap preferably upstream of the aligned passages, and in which the contact connecting lines are guided so that they are connected to the at least one lateral plug member.

3. The adjusting device, as claimed in claim 2, wherein the tube in connected to the drive housing so that the tube and the drive housing are a single piece.

4. The adjusting device, as claimed in claim 1, wherein the contact connecting lines are provided with flexible spring contact lugs which rest preferably against complementary contacts on the mirror glass.

* * * * *